United States Patent
Shank (10) Patent No.: US 12,141,432 B2
(45) Date of Patent: *Nov. 12, 2024

(54) VEHICLE OCCUPANT DETECTION SYSTEM

(71) Applicant: UUSI, LLC, Reed City, MI (US)

(72) Inventor: David W. Shank, Hersey, MI (US)

(73) Assignee: UUSI, LLC, Reed City, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/217,455

(22) Filed: Jun. 30, 2023

(65) Prior Publication Data

US 2023/0342023 A1    Oct. 26, 2023

Related U.S. Application Data

(63) Continuation-in-part of application No. 17/203,031, filed on Mar. 16, 2021, now Pat. No. 11,726,651,
(Continued)

(51) Int. Cl.
*G06F 3/0488* (2022.01)
*B60K 35/00* (2024.01)
(Continued)

(52) U.S. Cl.
CPC ............ *G06F 3/0488* (2013.01); *B60K 35/00* (2013.01); *B60K 35/10* (2024.01);
(Continued)

(58) Field of Classification Search
CPC ........ B60K 2360/148; B60K 2360/176; B60K 2360/178; B60K 2360/566;
(Continued)

(56) References Cited

U.S. PATENT DOCUMENTS

| 4,766,368 A | 8/1988 | Cox |
| 4,825,385 A | 4/1989 | Dolph et al. |

(Continued)

FOREIGN PATENT DOCUMENTS

| EP | 2613232 A1 | 7/2013 |
| WO | 0127868 A1 | 4/2001 |

(Continued)

OTHER PUBLICATIONS

ISR & Written Opinion of the ISA for PCT/US2010/040541 dated Sep. 1, 2010.

(Continued)

*Primary Examiner* — Hong Zhou
(74) *Attorney, Agent, or Firm* — Howard & Howard Attorneys PLLC (57) ABSTRACT

An occupant detection system and method may include a user interface and at least one sensor to determine if there is an occupant in the vehicle. In one embodiment, the system and method use capacitive sensing sensors embedded into a cushion and/or back of seats in a vehicle. The capacitive sensor sends a sense signal to a controller and the controller would recognize various conditions such as an empty seat or a seat occupied by a person or animal. It could also determine if there was a child seat in a position on a vehicle seat and if there is a child in the child seat.

21 Claims, 3 Drawing Sheets

Related U.S. Application Data which is a continuation-in-part of application No. 16/820,613, filed on Mar. 16, 2020, now Pat. No. 11,216,175, which is a continuation of application No. 14/028,941, filed on Sep. 17, 2013, now Pat. No. 10,592,092, which is a continuation-in-part of application No. 12/496,938, filed on Jul. 2, 2009, now Pat. No. 9,046,967.

(60) Provisional application No. 62/990,406, filed on Mar. 16, 2020.

(51) Int. Cl.
*B60K 35/10* (2024.01)
*G06F 3/0354* (2013.01)
*G06F 3/041* (2006.01)
*G06F 3/044* (2006.01)
*G06F 3/04883* (2022.01)
*G06F 3/04886* (2022.01)
*B60K 35/80* (2024.01)

(52) U.S. Cl.
CPC ...... *G06F 3/03547* (2013.01); *G06F 3/04166* (2019.05); *G06F 3/0446* (2019.05); *G06F 3/04883* (2013.01); *G06F 3/04886* (2013.01); *B60K 35/80* (2024.01); *B60K 2360/569* (2024.01); *G06F 2203/04101* (2013.01)

(58) Field of Classification Search
CPC ........ B60K 2360/569; B60K 2360/741; B60K 35/00; B60K 35/10; B60K 35/28; B60K 35/65; B60K 35/80; B60N 2/002; B60N 2/0024; B60N 2/28; B60N 2/266; B60N 2210/12; B60W 2040/0881; B60W 50/14; G06F 2203/04101; G06F 3/03547; G06F 3/04166; G06F 3/0446; G06F 3/0488; G06F 3/04883; G06F 3/04886

See application file for complete search history.

(56) References Cited

U.S. PATENT DOCUMENTS

| | | |
|---|---|---|
| 4,933,807 A | 6/1990 | Duncan |
| 5,305,017 A | 4/1994 | Gerpheide |
| 5,337,353 A | 8/1994 | Boie et al. |
| 5,463,388 A | 10/1995 | Boie et al. |
| 5,565,658 A | 10/1996 | Gerpheide et al. |
| 5,621,290 A | 4/1997 | Heller et al. |
| 5,730,165 A | 3/1998 | Philipp |
| 5,801,340 A | 9/1998 | Peter |
| 5,832,397 A | 11/1998 | Yoshida et al. |
| 5,952,801 A | 9/1999 | Boisvert et al. |
| 5,986,421 A | 11/1999 | Fukazawa et al. |
| 6,064,165 A | 5/2000 | Boisvert et al. |
| 6,144,114 A | 11/2000 | Chutorash |
| 6,181,996 B1 | 1/2001 | Chou et al. |
| 6,233,872 B1 | 5/2001 | Glagow et al. |
| 6,275,146 B1 | 8/2001 | Kithil et al. |
| 6,337,549 B1 | 1/2002 | Bledin |
| 6,346,935 B1 | 2/2002 | Nakajima et al. |
| 6,377,009 B1 | 4/2002 | Philipp |
| 6,389,752 B1 | 5/2002 | Rosenau |
| 6,404,158 B1 | 6/2002 | Boisvert et al. |
| 6,499,359 B1 | 12/2002 | Washeleski et al. |
| 6,555,982 B2 | 4/2003 | Tyckowski |
| 6,559,555 B1 | 5/2003 | Saitou et al. |
| 6,782,759 B2 | 8/2004 | Shank et al. |
| 6,936,986 B2 | 8/2005 | Nuber |
| 6,946,853 B2 | 9/2005 | Gifford et al. |
| 6,968,746 B2 | 11/2005 | Shank et al. |
| 7,015,666 B2 | 3/2006 | Staus |
| 7,030,860 B1 | 4/2006 | Hsu et al. |
| 7,038,414 B2 | 5/2006 | Daniels et al. |
| 7,132,642 B2 | 11/2006 | Shank et al. |
| 7,162,928 B2 | 1/2007 | Shank et al. |
| 7,293,467 B2 | 11/2007 | Shank et al. |
| 7,312,591 B2 | 12/2007 | Washeleski et al. |
| 7,342,373 B2 | 3/2008 | Newman et al. |
| 7,421,321 B2 | 9/2008 | Breed et al. |
| 7,449,852 B2 | 11/2008 | Washeleski et al. |
| 7,471,334 B1 | 12/2008 | Stenger |
| 7,518,327 B2 | 4/2009 | Newman et al. |
| 7,576,631 B1 | 8/2009 | Bingle et al. |
| 7,653,883 B2 | 1/2010 | Hotelling et al. |
| 7,813,025 B2 | 10/2010 | Ribi |
| 8,040,326 B2 | 10/2011 | Hotelling et al. |
| 9,415,689 B2 | 8/2016 | Wäller et al. |
| 11,059,490 B1* | 7/2021 | Migneco ............... G07C 5/085 |
| 2001/0052839 A1 | 12/2001 | Nahata et al. |
| 2002/0003571 A1 | 1/2002 | Schofield et al. |
| 2002/0039008 A1 | 4/2002 | Edgar et al. |
| 2002/0055811 A1 | 5/2002 | Obradovich |
| 2002/0070862 A1 | 6/2002 | Francis et al. |
| 2002/0152010 A1 | 10/2002 | Colmenarez et al. |
| 2002/0190961 A1 | 12/2002 | Chen |
| 2004/0046452 A1 | 3/2004 | Suyama et al. |
| 2004/0056842 A1 | 3/2004 | Tisaka et al. |
| 2004/0119688 A1 | 6/2004 | Troxell et al. |
| 2004/0215382 A1 | 10/2004 | Breed et al. |
| 2004/0233677 A1 | 11/2004 | Su et al. |
| 2005/0012484 A1 | 1/2005 | Gifford et al. |
| 2005/0251314 A1 | 11/2005 | Schindler et al. |
| 2006/0006701 A1 | 1/2006 | Wells |
| 2006/0097991 A1 | 5/2006 | Hotelling et al. |
| 2006/0161871 A1 | 7/2006 | Hotelling et al. |
| 2006/0229811 A1 | 10/2006 | Herman et al. |
| 2006/0238517 A1 | 10/2006 | King et al. |
| 2007/0075986 A1 | 4/2007 | Chen |
| 2007/0152615 A1 | 7/2007 | Newman et al. |
| 2007/0257890 A1 | 11/2007 | Hotelling et al. |
| 2007/0273560 A1 | 11/2007 | Hua et al. |
| 2008/0048997 A1 | 2/2008 | Gillespie et al. |
| 2008/0129684 A1 | 6/2008 | Adams et al. |
| 2008/0147308 A1 | 6/2008 | Howard et al. |
| 2009/0079705 A1 | 3/2009 | Sizelove et al. |
| 2009/0132130 A1 | 5/2009 | Kumon et al. |
| 2009/0144622 A1 | 6/2009 | Evans et al. |
| 2009/0146846 A1 | 6/2009 | Grossman |
| 2009/0179988 A1 | 7/2009 | Reibel et al. |
| 2009/0193361 A1 | 7/2009 | Lee et al. |
| 2009/0198420 A1 | 8/2009 | Newman et al. |
| 2009/0210110 A1 | 8/2009 | Dybalski et al. |
| 2009/0219134 A1 | 9/2009 | Nakasato et al. |
| 2009/0234542 A1 | 9/2009 | Orlewski |
| 2009/0244017 A1 | 10/2009 | Pala et al. |
| 2009/0309851 A1 | 12/2009 | Bernstein |
| 2010/0001971 A1 | 1/2010 | Jiang et al. |
| 2010/0097346 A1 | 4/2010 | Sleeman |
| 2010/0117845 A1 | 5/2010 | Satz et al. |
| 2010/0188248 A1 | 7/2010 | Sultan et al. |
| 2010/0188343 A1 | 7/2010 | Bach |
| 2010/0222939 A1 | 9/2010 | Namburu et al. |
| 2010/0260350 A1 | 10/2010 | Chutorash et al. |
| 2010/0295670 A1 | 11/2010 | Sato et al. |
| 2010/0295812 A1 | 11/2010 | Burns et al. |
| 2010/0302201 A1 | 12/2010 | Ritter et al. |
| 2011/0074565 A1 | 3/2011 | Cuddihy et al. |
| 2011/0080363 A1 | 4/2011 | Kao et al. |
| 2011/0206239 A1 | 8/2011 | Wada et al. |
| 2011/0246026 A1 | 10/2011 | Shuster |
| 2012/0038559 A1 | 2/2012 | Radivojevic et al. |
| 2012/0316702 A1 | 12/2012 | Liu |
| 2013/0009761 A1* | 1/2013 | Horseman ............ A61B 5/6893 340/576 |
| 2013/0030645 A1 | 1/2013 | Divine et al. |
| 2013/0307771 A1 | 11/2013 | Parker et al. |
| 2014/0028542 A1 | 1/2014 | Lovitt et al. |
| 2014/0300561 A1 | 10/2014 | Waller et al. |
| 2016/0089084 A1 | 3/2016 | Sugiyama |
| 2017/0113615 A1 | 4/2017 | Fendt |
| 2020/0241824 A1* | 7/2020 | Lee .................. G06F 3/017 |

(56) References Cited

U.S. PATENT DOCUMENTS

| | | | | |
|---|---|---|---|---|
| 2020/0398637 | A1* | 12/2020 | Chang | G08B 21/02 |
| 2021/0078529 | A1* | 3/2021 | Sung | B60R 22/48 |
| 2021/0188287 | A1* | 6/2021 | Taveira | B62D 1/183 |

FOREIGN PATENT DOCUMENTS

| | | | |
|---|---|---|---|
| WO | 0212669 | A1 | 2/2002 |
| WO | 0227132 | A1 | 4/2002 |
| WO | 03038220 | A1 | 5/2003 |
| WO | 2005114369 | A2 | 12/2005 |

OTHER PUBLICATIONS

Extended European Search Report for EP 14 18 4912 dated Apr. 17, 2015.

Final Office Action regarding U.S. Appl. No. 14/700,731 dated May 16, 2016.

Non-Final Office Action regarding U.S. Appl. No. 14/700,731 datred Dec. 15, 2016.

Buxton, B., "31.1: Invited Paper: A Touching Story: A Personal Perspective on the History of Touch Interfaces Past and Future," Society for Information Display (SIDS) Symposium Digest of Technical Papers, vol. 41, No. 1, Session 31, May 2010, pp. 444-448.

Hinckley, K., et al., "38.2: Direct Display Interaction via Simultaneous Pen + Multi-touch Input," Society for INformation Display (SID) Symposium Digest of Tenical Papers, vol. 41, No. 1, Session 38, May 2010, pp. 537-540.

Lee, S., "A Fast Multiple-Touch-Sensitive-Input Device," University of Toronto, Department of Electrical Engineering, Master Thesis, Oct. 1984, 118 pages.

Hillis, W.D., "A High-Resolution Imaging Touch Sensor," The International Journal of RObotics Research, vol. 1, No. 2, Summer Jun.-Aug. 1982, pp. 33-44.

Lee, S.K., et al., "A Multi-Touch Three Dimensional Touch-Sensitive Tablet," Proceedings of the SIGCHI Conference on Human Factors in Computing Systems, Apr. 1985, pp. 21-25.

Hlady, A.M., "A Touch Sensitive X-Y Position Encoder for Computer Input," Proceedings of the Fall Joint-Computer Conference, Nov. 18-20, 1969, pp. 545-551.

Sasaki, L., et al., "A Touch-Sensitive Input Device," International Computer Music Conference Proceedings, Nov. 1981, pp. 293-296.

Callaghan, J., et al., "An Empirical Comparison of Pie vs. Linear Menus," Human Factors in Computing Sysems: Chicago '88 Conference Proceedings: May 15-19, 1988, Washington DC: SPecial Issue of the SIGCHI Bulletin, New York, Association for Computing Machinery, pp. 95-100.

Casio, AT-550 Advertisement, published in Popular Science by On The Run, Feb. 1984, p. 129.

Casio, "Module No. 320," AT-550 Owner's Manual, at least as early as Dec. 1984, 14 pages.

Smith, S.D., et al., "Bit-sliceMicroprocessors in H.F. Digital Communications," The Radio and Electronic Engineer, vol. 51, No. 6, Jun. 1981, pp. 29-301.

Boie, R.A., "Capacitive Impedeance Readout Tactile Image Sensor," Proceedings of the IEEE International Conference on Robotics and Automation, vol. 1, Mar. 1984, pp. 370-372.

Thompson, C., "Clive Thompson on The Breakthrough Myth," Wired Magazine, http://www.wired.com/magazine/2011/07/st_thompson_breakthrough, Aug. 2011, 3 pages.

"Innovation in Information Technology," National Research Council of the National Academies, Computer Science and Telecommunications Board, Division of Engineering and Physical Sciences, http://www.nap.edu/catalog/10795 html, 2003, 85 pages.

Buxton, W., et al., "Issues and Techniques in Touch-Sensitive Tablet Input," Proceedings of SIGGRAPH '85, vol. 19, No. 3, Jul. 22-26, 1985, pp. 215-223.

Buxton, W., et al., "Large Displays in Automotive Design," IEEE Computer Graphics and Applications, Jul./Aug. 2000, pp. 68-75.

Buxton, W., "Lexical and Pragmatic Consideration of Input Structures," ACM SIGGRAPH Computer Graphics, vol. 17, No. 1, Jan. 1983, pp. 31-37.

Betts, P., et al., "Light Beam Matrix Input Terminal," IBM Technical Disclosure Bulletin, Oct. 1966, pp. 493-494.

Buxton, B., "Multi-Touch Systems that I Have Known and Loved," downloaded from http://www.billbuxton.com/multitouchoverview.html, Jan. 12, 2007, ww pages.

Herot, C.F., et al., "One-Point Touch Input of Vector Information for Computer Displays," Proceedings of the 5th Annual Conference on Computer Graphics and Interactive Techniques, Aug. 23-25, 1978, pp. 210-216.

Wolfeld, J.A., "Real Time Control of a Robot Tactile Sensor," University of Pennsylvania, Dept. of Computer & Information Science, Technical Reports (CIS), Master Thesis, http://respository.upenn.edu/cisreports/678, Aug. 1981, 68 pages.

Lewis, J.R., "Reaping the Benefits of Modern Usability Evaluation: The Simon Story," Advances in Applied Ergonomics: Proceedings of the 1st International Conference on Applied Ergonomics, ICAE May 21-24, 1996, pp. 752-755.

"Casio AT-550 Touch Screen Calculator Watch (1984)," http://www.youtube.com/watch?v=UhVAsqhfhqU, May 24, 2012, 1 page.

Wikipedia, "Indium Tin Oxide," (Mar. 29, 2019), <URL http://web.archive.org/web/20100429134539/http://en.wikipedia.org/wiki/indium_tin_oxide/> p. 1-3.

Kolokowsky, et al., "Touchscreens 101: Understanding Touchscreen Technology and Design," Cypress Perform, http://www.planetanalog.com, 5 pages, Planet Analog.

Narkatani, L.H., et al., "Soft Machines: A Philosophy of User-Computer Interface Design," Proceedings of the SIGCHI Conference on Human Factors in Computing Systems, Dec. 1983, Chicago, pp. 19-23.

Rubine, D.H., "The Automatic Recognition of Gestures," Carnegie Mellon University, Master Thesis, Cmu- CS-91-202, Dec. 1991, 285 pages.

Kurtenbach, G.P., "The Design and Evaluation of Marking Menus," University of Toronto, Graduate Dept. of Computer Science, Master Thesis, May 1993, 201 pages.

Hopkins, D., "The Design and Implementation of Pie Menus," originally published in Dr. Dobb's Journal, Dec. 1991, lead cover story, user interface issue, reproduced at www.DonHopkins.com, 8 pages.

Buxton, B., "The Long Nose of Innovation," Bloomberg Businessweek, Innovation & Design, Jan. 2, 2008, 3 pages, downloaded from http://www.businessweek.com/stories/2008-01-02/the-long-nose-of-innovationbusinessweek-business-news-stock-market-and-financialadvice.

Buxton, B., "The Mad Dash Toward Touch Technology," Bloomberg Businessweek, Innovation & Design, Oct. 21, 2009, 3 pages, downloaded from: http://www.businessweek.com/innovate/content/Oct. 2009/d20091021_629186.

"The Sensor Frame Graphic Manipulator," NASA Phase II Final Report, NASA-CR-194243, May 8, 1992, 28 pages.

Izadi, S., et al., "ThinSight: A Thin Form-Factor Interactive Surface Technology," Communications of the ACM, Research Highlights, vol. 52, No. 12, Dec. 2009, pp. 90-98.

Krueger, M.W., et al., "VIDEOPLACE—An Artificial Reality," Proceedings of the SIGCHI Conference on Human Fa tors in Computing Systems, Apr. 1985, pp. 35-40.

Brown, E., et al., "Windows on Tablets as a Means of Achieving Virtual Input Devices," Proceedings of the IFIP TC13 Third International Conference on Human-Computer Interaction, Aug. 27-31, 1990, in D. Diaper, et al.(Eds), Human-Computer Interaction—INTERACT '90, Amsterdam: Elsevier Science Publishers B.V. (North Holland), 11 pages.

"A Multi-Touch Three Dimensional Touch-Sensitive Tablet," http://www.youtube.com/watch?v=Amus9CxUiA, Nov. 18, 2009, 1 page.

\* cited by examiner

VEHICLE OCCUPANT DETECTION SYSTEM

CROSS-REFERENCE TO RELATED APPLICATION(S)

The present application is a continuation-in-part of U.S. Ser. No. 17/203,031, filed Mar. 16, 2021, which claims the benefit of and priority to U.S. Provisional Patent Application Ser. No. 62/990,406, filed Mar. 16, 2020, and which is a continuation-in-part of U.S. Ser. No. 16/820,613, filed Mar. 16, 2020, which is a continuation of U.S. Ser. No. 14/028,941, filed Sep. 17, 2013 (now U.S. Pat. No. 10,592,092, issued Mar. 17, 2020), which is a continuation-in-part of U.S. Ser. No. 12/496,938, filed Jul. 2, 2009 (now U.S. Pat. No. 9,046,967, issued Jun. 2, 2015), the entire disclosures of which are hereby expressly incorporated by reference.

BACKGROUND OF THE INVENTION

1. Field of the Invention

The present invention relates to systems and methods for detecting occupants in a vehicle and, more particularly, to an occupant detection system and method for a vehicle.

2. Description of the Related Art

A vehicle, such as an automobile, truck, boat, and the like typically includes one or more user interfaces accessible by occupants including an operator and passengers for displaying information. A user interface may also include one or more inputs that an occupant uses, or the vehicle uses, to sense and control a vehicle function or accessory like an alarm, a radio, navigation, or phone use. A user interface may also be used to control portable accessories for the vehicle or occupants, such as a key fob, mobile phone, or a cloud based service.

In various types of vehicles, a user interface, such as a center stack console, is accessible to the operator and front seat passengers. The center stack has user interfaces for many vehicle functions and may include switches, knobs, light indicators, displays including touch sensitive displays, and the like. Other areas of a vehicle that may have user interfaces for sensing, control, and/or information display include overhead consoles where sunroof and interior lighting controls may be placed. The particular type of user interface and its location may vary depending on the type of information displayed or accessory being controlled across a wide variety of applications.

Occupant detection sensors in vehicles are typically reserved for use by the air-bag deployment system of the vehicle. It is desirable to provide a new occupant detection system for a vehicle.

SUMMARY OF THE INVENTION

A system and method for determining if an occupant such as a person or animal is located within an interior of a vehicle.

An embodiment of an occupant detection system or detection method for a vehicle according to the present disclosure may include a user interface and at least one sensor to determine if there is an occupant in the vehicle. For example, one embodiment would use capacitive sensing sensors embedded into a cushion and/or back of seats in a vehicle. The capacitive sensor would send a sense signal to a controller and the controller would recognize various conditions such as an empty seat or a seat occupied by a person or animal. It could also determine if there was a child seat in a position on a vehicle seat and if there is a child in the child seat.

Accordingly, the present invention provides an occupant detection system for a vehicle including a user interface having a touch sensitive input device adapted to be fixedly mounted to a vehicle with a touch sensitive active surface. The occupant detection system also includes at least one first sensor located in a seat back of a seat assembly of the vehicle and at least one second sensor located in a seat cushion of the seat assembly. The at least one first sensor and the at least one second sensor are operable for detecting an occupant in the seat assembly. The occupant detection system further includes a controller in communication with the user interface and the at least one first sensor and the at least one second sensor to receive sensor signals from the at least one first sensor and the at least one second sensor and user interface signals from the user interface. The controller is operable for monitoring the at least one first sensor and the at least one second sensor and the user interface. The controller includes an artificial intelligence algorithm to process the sensor signals and the user interface signals and determines whether the seat assembly is unoccupied and occupied and characteristics of any occupant in the seat assembly if the seat assembly is occupied.

The present invention also provides a method for detecting an occupant in a vehicle including steps of providing an occupant detection system including a user interface having a touch sensitive input device adapted to be fixedly mounted to a vehicle with a touch sensitive active surface, at least one first sensor located in a seat back of a seat assembly of the vehicle and at least one second sensor located in a seat cushion of the seat assembly, and a controller in communication with the user interface and the at least one first sensor and the at least one second sensor. The method also includes steps of detecting by the at least one first sensor and the at least one second sensor an occupant in the seat assembly, and receiving, by the controller, sensor signals from the at least one first sensor and the at least one second sensor and user interface signals from the user interface. The method further includes steps of processing, by an artificial intelligence algorithm of the controller, the sensor signals and the user interface signals, and determining, by the controller, whether the seat assembly is occupied and characteristics of any occupant in the seat assembly if the seat assembly is occupied.

The above embodiments, features, and advantages as well as other embodiments, features, and advantages of a system or method according to the present disclosure will be readily apparent to one of ordinary skill in the art from the following detailed description taken in connection with the accompanying drawings.

DETAILED DESCRIPTION OF THE EMBODIMENT(S)

As those of ordinary skill in the art will understand, various features illustrated and described with reference to any one of the Figures may be combined with features illustrated in one or more other Figures to produce embodiments that are not necessarily explicitly illustrated or described. The combinations of features illustrated provide representative embodiments for representative applications. However, various combinations and modifications of the features consistent with the teachings of this disclosure may be desired for particular applications or implementations.

Touch sensitive user interface devices according to the present invention may be used in a wide variety of applications. In vehicle applications, for example, touch sensitive user interface devices facilitate interaction with the vehicle by means of a touch screen display, by sensors embedded in a seat to detect if the seat is occupied, or by various vehicle trim components, internal or external, with specific touch areas to initiate, modify, or stop a function.

As used herein, a touch sensitive user interface refers to virtually any type of user interface that includes one or more regions used to sense user input associated with proximity to, or contact with, the touch sensitive region.

Figure 1:
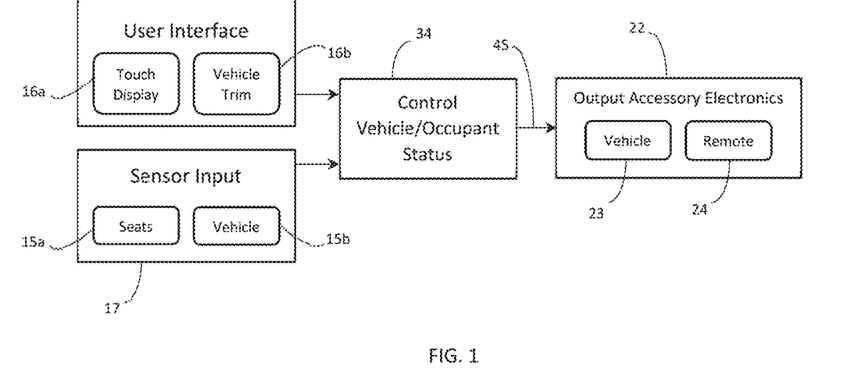
FIG. 1 illustrates a block diagram of a system having a user interface and sensor inputs that may be used to detect an occupant in a vehicle and control a vehicle accessory in accordance with an embodiment of the present disclosure.

Referring to FIG. 1, a block diagram illustrating one embodiment of a system 10, according to the present invention, is shown having a user interface 14 with one or more touch sensitive regions such as a touch display 16a or vehicle trim 16b that may be used to control one or more vehicle accessories. The system 10 also has sensor input 17 including at least one of a capacitive sensor, an accelerometer, a temperature sensor, an acoustic sensor, a weight sensor, a visible image, a thermal image, a radar sensor, and gas sensing, any or all of which may be embedded in a seat 15a or positioned advantageously within a vehicle 15b. Signals from the user interface 14 and the sensor input 17 are communicated to an electronic controller 34 so that a vehicle occupant status can be determined. The occupant status is then acted upon appropriately by communicating to output accessory electronics 22 that includes a vehicle electronic controller 23 or to a remote device 24 such as a cell phone or key fob. The output accessory electronics 22 may be implemented by software and/or hardware using proprietary or standard, wired or wireless communication protocols, for example. It should be appreciated that the controller 34 includes a processor for carrying out an algorithm or set of instructions for the steps of the method, according to the present invention.

Figure 2:
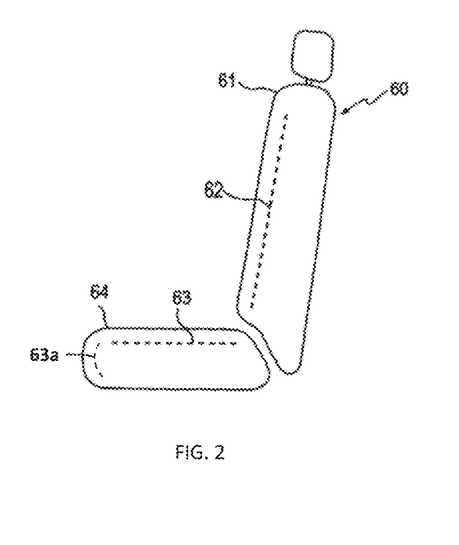
FIG. 2 illustrates a first configuration for mounting capacitive sensors into a seat of a vehicle in accordance with an embodiment of the present disclosure.

Referring now to FIG. 2, with continual reference to FIG. 1, a vehicle seat assembly 60 having occupant detection sensors 62 and 63 in accordance with one embodiment of the present invention is shown. The occupant detection sensors 62 and 63 are respectively placed into a seat back 61 and a seat cushion 64 of the seat assembly 60 and provide information about what is on, or proximate to, the seat assembly 60. The occupant detection sensors 62 and 63 employ proximity and/or force sensor sensors to sense motion, weight, and dimensional characteristics of objects or occupants such as child seats, infant carriers, animals, or persons placed on the seat assembly 60. It should be appreciated that other sensing mechanisms such as ultrasonic, radar, vision, thermal, gas, accelerometer, and audio sensors can be used to further differentiate between living and inanimate objects placed on or in proximity to, the seat assembly 60.

The occupant detection sensors in vehicles are typically reserved for use by the air-bag deployment system of the vehicle. However, information from these sensors and/or other sensors embedded into the seat assembly 60 can also be used for determining if an occupant is present. Information from embedded sensors such as the occupant detection sensors 62, 63, and 63a of FIGS. 2, and 62, 64, 66, and 68 of FIG. 3 can be gathered directly from the sensors or from another electronic module through a communications network such as CAN or LIN. It should be appreciated that information received from these sensors can be used to determine if an infant, young child, adult, or animal is in the vehicle.

Figure 3:
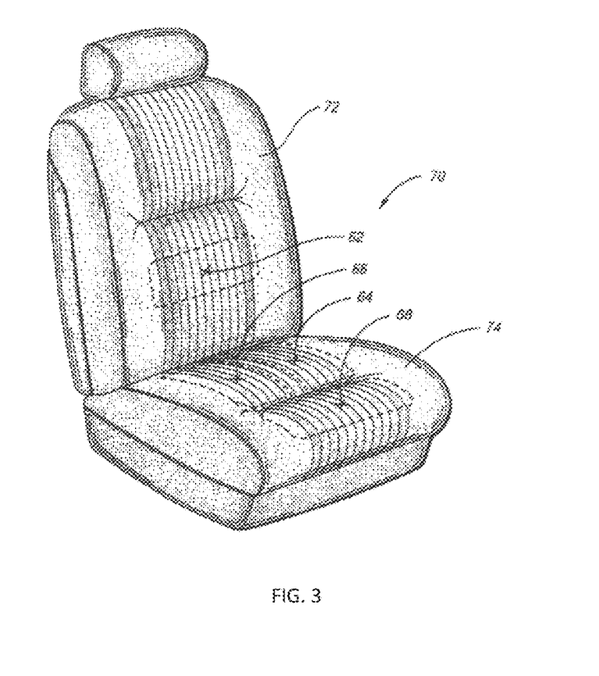
FIG. 3 illustrates another configuration for mounting capacitive sensors into a seat of a vehicle in accordance with an embodiment of the present disclosure.

Referring now to FIG. 3, another embodiment of an occupant detection system 10, according to the present invention, is shown for a seat assembly 70. The occupant detection system 10 includes four capacitance sensors 62, 64, 66, and 68 for the seat assembly 70. The capacitance sensors include a seat back sensor 62 located within a seat back 72, a seat cushion left sensor 64, a seat cushion right sensor 66, and a seat cushion front sensor 68, all located within a seat cushion 74. The sensors 62, 64, 66, and 68 monitor the seat assembly 70 to determine the characteristics such as presence, size, position, and type of an occupant seated in the seat assembly 70.

Figure 4:
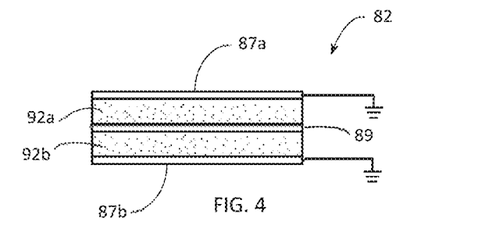
FIG. 4 illustrates a three-element seat sensor layered structure in accordance with an embodiment of the present disclosure.
Figure 5:
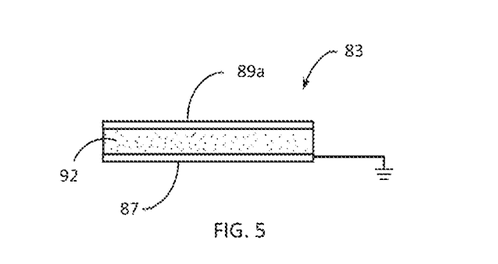
FIG. 5 illustrates a two-element seat sensor layered structure in accordance with an embodiment of the present disclosure.
Figure 6:
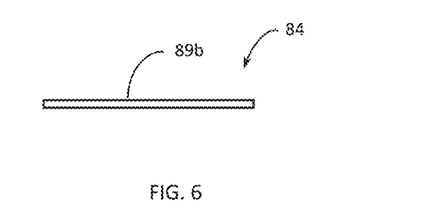
FIG. 6 illustrates a single element seat sensor in accordance with an embodiment of the present disclosure.

FIGS. 4-6 show various sensor construction methods that may be used in seat occupancy sensing. FIG. 4 shows a sensor 82 that comprises three electrically conductive layers, 87a, 87b, and 89. The layers 87a and 87b are both electrically connected to ground, the layer 89 is an active sensing layer, and layers 92a and 92b are a dielectric material, such as a foam, that is compressible. The sensor 82 may be made from a lamination process although extrusion techniques may be used. The conductive layers 87a, 87b, and 89 may be flexible conductive wire woven together, a mylar film or other similar film with at least one electrically conductive layer, a fabric with a metallized surface or with embedded conductive wire, or any other suitable electrically conductive material. Any of the aforementioned metallized surfaces or layers may be the same size/surface area as a sensor, such as the sensor 82, but the metallized layer may also be selectively deposited, woven, or etched so that the conductive portion can be formed into a desirable pattern. During the lamination process, or other appropriate process, adhesive may be applied to appropriate sensor surfaces for the adherence of the sensor 82 to a desired mounting surface.

If a force is applied to the outer surface of the conductive layer 87a for example, the dielectric layers 92a and 92b will compress and the active sensing layer 89 will be deformed. The act of compressing the layers together brings the active sense layer 89 into closer proximity to the conductive layers 87a and 87b. By doing so, the capacitance of the sensor 82 will increase according to the well-known formula $C=\varepsilon_o\varepsilon_r A/d$ where $\varepsilon_o$ is the permeability of free space, $\varepsilon_r$ is the dielectric constant of the compressible layer(s), where A is the surface area of the sensor, and d is the distance between the electrically conductive layers. The sensor configuration in FIG. 4 senses compression due to an applied force which is related to weight. It should be appreciated that the sensor configuration of FIG. 4 cannot sense the proximity of an electrically conductive object.

FIG. 5 shows a sensor 83 that comprises two electrically conductive layers, 87 and 89a. The layer 87 is electrically connected to ground, the layer 89 is an active sensing layer, and a layer 92 is a dielectric material, such as a foam, that is compressible. If a force is applied to the outer surface of the conductive layer 89a for example, the dielectric layer 92 will compress. The act of compressing the dielectric layer 92 brings the active sense layer 89a into closer proximity to the conductive layer 87. By doing so, the capacitance of the sensor 83 will increase in the same manner as previously stated. The sensor configuration in FIG. 5 senses compression due to an applied force which is related to the weight of an object placed on the sensor 83. However, the sensor 83 differs from the sensor 82 of FIG. 4 in that because the active layer 89a is not contained within grounded layers, the sensor 83 can also sense the proximity of an electrically conductive object to the active layer 89a. This allows, in this embodiment, sensing of an infant and/or a child while they are seated in an infant or child seat (not shown). It should be appreciated that the positioning of the infant/child seat whether forward facing or rear facing does not matter since the infant or child is able to be sensed solely on their proximity to the sensor 84.

As previously stated, the sensor 83 can sense an applied force due to the compression. The configuration of this sensor 83 provides an output if an infant or child is in proximity to the sensor 83, as well as if an infant/child seat is physically touching and compressing the sensor 83 as would be the case when the infant/child seat is secured in the seat assembly of the vehicle. The sensor 83 further provides for determining if an infant or child is in the infant/child seat because having an infant or child in the infant/child seat would further compress the sensor 83 beyond where it would be if the infant/child seat is empty. If an empty infant/child seat is normalized, that is zeroed, the controller 34 knows that the seat assembly is empty, the further compression of the sensor 83 when an infant or child is in the infant/child seat will allow the controller 34 to recognize that an infant or child is present and will allow an estimate weight of the infant or child. Further, if there is movement of an infant or child, the sensors in the seat assembly will provide a capacitance signal modulated by the movement. It should be appreciated that this modulated signal may be used to determine or increase confidence that there is an occupant in a seat and to a limited.

FIG. 6 shows a sensor 84 that comprises an electrically conductive layer 89b. The layer 89b is an active sensing layer with no attached dielectric material or grounded layer. As such, the sensor 84 can sense the proximity of an electrically conductive object to the active conductive layer 89, but it cannot sense compression of the sensor 84 as previously described for sensors 82 and 83. Similarly to the sensor 83 of FIG. 5, this embodiment provides sensing of an infant and/or a child while they are seated in an infant or child seat. It should be appreciated that the positioning of the infant or child seat whether forward facing or rear facing does not matter since the infant or child is able to be sensed solely on their proximity to the sensor 84.

Figure 7:
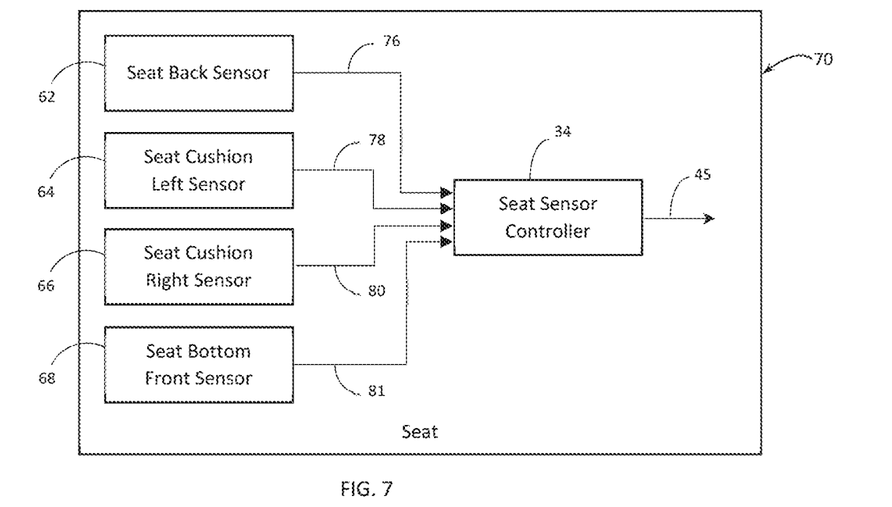
FIG. 7 illustrates a block diagram of a system having a user interface that may be used to control a vehicle accessory in accordance with an embodiment of the present invention.

Referring to FIG. 7, each sensor 62, 64, 66, and 68 monitors the seat assembly 70 and generates seat sensor signals 76, 78, 80, and 81, respectively. The controller 34 receives the seat sensor signals 76, 78, 80, and 81 and processes them to determine if the seat assembly 70 is occupied and the characteristics of any occupant.

The signal 76 from the seat back sensor 62 is used to determine if the occupant of the seat assembly 70 is sitting back on the seat back 72. The seat sensor signals 78 and 80 from the seat bottom left and right sensors 64 and 66 to determine whether the occupant of the seat assembly 70 is sitting centered or more left or right in the seat assembly 70. The seat sensor signal 81 from the seat bottom front sensor 68 is used to determine whether the occupant of the seat assembly 70 is sitting toward the front of the seat assembly 70. For example, if the signals 78 and 80 are small and the signal 81 is large, it is an indication that an occupant is sitting forward in the seat assembly 70. While the controller 34 shown in FIG. 7 is shown to be integral to the seat assembly 70, it is understood that it may reside outside of the seat assembly 70 at an appropriate location.

The non-conductive or dielectric layers 92a and 92b may be an EPDM closed cell foam or the like. Each of the sensors 62, 64, 66, and 68 can be configured into different shapes for placement into the seat assembly 70 as the conductive plates 86, 88, and 90 are flexible and the non-conductive layers 92a and 92b are compressible. Different shapes, cut-outs, slits and the like may be employed in the sensors 62, 64, 66, and 68 to allow for sensor conformance to an occupant profile and/or seat shape so that a seat sensor does not pucker, bulge, and the like to cause a visible bump in the seating surface or to become uncomfortable to an occupant.

The controller 34 further monitors vehicle status such as an ignition signal, vehicle door activity, vehicle door locks, key fob proximity, and the like to determine when the operator is leaving or has left the vehicle. If the controller 34 senses the presence of persons or animals inside the vehicle after it has determined that the operator has, or is, leaving the vehicle, the controller 34 sends a warning signal 45 to the operator indicating that the vehicle has been exited while occupants remain in the vehicle. This warning can be given to the operator by sounding an alarm 23 of the vehicle such as the vehicle horn, and/or lighting a warning indicator such as a dedicated indicator or any other light such as flashing of headlights and/or brake lights. The warning may also send a signal to a remote 24 such as a key fob, cell phone, connected watch, and the like to get the attention of the operator. In another embodiment, the touch sensitive active surface of the user interface 14 includes an on/off switch acknowledgement of the seat assembly 70 being occupied. For example, the controller 34 sends a signal to the user interface 14, which then displays the on/off switch acknowledgement. In another embodiment, the touch sensitive active surface includes of the user interface 14 includes an indicator light or message indication of the seat assembly 70 being occupied. For example, the controller sends a signal to the user interface 14 to light or turn ON the indicator light or display a message that the seat assembly 70 is occupied.

As another level of protection, the controller 34 can perform vehicle functions such as a venting operation via a sunroof or window, or enabling a fan or an HVAC system to cool the cabin of the vehicle to help ensure the safety of an occupant left inside the vehicle while unattended. As described, the system 10 acts accordingly when the vehicle interior temperature is too hot, but it can also act accordingly if the interior temperature is too cold by enabling an HVAC system to heat the cabin of the vehicle. It should be appreciated that these venting and/or HVAC functions can be performed coincident with audible and visual warnings as previously described.

As another further level of protection, if no response to all warnings has been addressed in a determined amount of time, the controller 34 may initiate an emergency services call such as 911 in the US, 119 in Japan, or 112 in the UK. In doing so, the vehicle can provide detailed location of the vehicle as determined by GPS, cell phone towers, vehicle to infrastructure (V2I) or vehicle to everything (V2X) communications, and the like. It should be appreciated that communication to emergency services can be initiated at any time including at the beginning of a venting and/or HVAC operation, or after a venting and/or HVAC operation is determined to be insufficient, or at any other predetermined time or condition.

In an alternate strategy, the occupant detection signal values are read from two or more seat sensors such as the sensors 62, 64, 66, and 68 of FIG. 7, and processed by the controller Various signal processing strategies may be used to combine the seat sensor signals, such as 76, 78, 80, and 81 of FIG. 7, to control and enhance detection sensitivity. In one embodiment, signal values are combined by summing. The collective signal value has a greater magnitude than a single sensor signal. It should be appreciated that other, more sophisticated mathematical/statistical techniques may be used to filter and/or process the raw data/signals provided by a group or array of sensors to detect a corresponding occupant detection signal.

In another alternate strategy, two or more seat sensors such as the sensors 62, 64, 66, and 68 of FIG. 7, are temporarily or persistently electrically connected together to create a sensor having a larger surface area. By increasing seat sensor surface area, the signal input to the controller 34 will exhibit a correspondingly stronger response to approaching or proximal objects.

It should be appreciated that this effectively makes the seat sensor more sensitive, allowing for smaller and/or further distant occupants to be sensed.

In another embodiment, the system 10 may include sensing input from more than one seat assembly 60, 70. As an example, in a $2^{nd}$ row seating of a vehicle, the seat sensor signals received from one seat assembly, say the driver side, may be compared with the seat sensor signals from another seat assembly such as the seat on the passenger side of the vehicle. This method will provide for comparing seat sensor signals from one seat to another seat to help determine if there is a fault with either seat sensor, or as a baseline to compare each seat against. For example, if the driver side seat has high seat sensor signals, and the passenger side seat has low seat sensor signals, the controller 34 can compare them to each other to aid in determining that there is an occupant on the seat with high sensor signals.

Any combination of the proximity detection methods can be implemented to achieve the desired characteristics of proximity detection of an approaching or proximal occupant.

Other occupant detection sensors may be employed at appropriate locations in addition to, or in place of seat sensors. Other sensor locations may include in a headliner, behind interior trim, or integrated into a door panel. The non-seat-located sensors may be capacitive sensing or could be any other non-capacitive sensing type.

Figure 8:
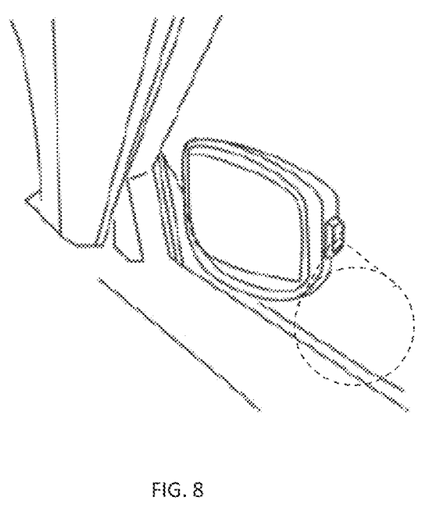
FIG. 8 illustrates a user interface having a camera mounted to a vehicle to allow for viewing of various seating locations in the vehicle in accordance with an embodiment of the present disclosure.

Another embodiment is when at least one camera that sends signals directly to the system 10 and the system 10 would recognize various conditions such as an empty seat or a seat occupied by a child seat, a person, or an animal. Both the capacitive sensing and camera would also allow the system 10 to determine if there is a person or animal present and visible including movement in any of the seating positions. Image analysis may employ image subtraction, edge detection, or other methods to determine movement. A camera located in a center stack, a headliner position, or in a headrest of the vehicle may allow all seating positions to be viewed. If there are other cameras on the vehicle, such as those on a front or middle support structure like the A or B pillars, they may be used to view the inside of the cabin of the vehicle. Referring to FIG. 8, cameras mounted on or in outside mirrors may be employed for viewing inside of the vehicle when they are in a folded in position. In the folded in position, the normally rear looking cameras may have adequate peripheral imaging to observe seating positions inside the cabin.

Another embodiment is when at least one radar system that sends signal directly to the system 10 and the system 10 would recognize various conditions such as an empty seat or a seat occupied by a child seat, a person, or an animal. Both the capacitive sensing and radar system would also allow the system 10 to determine if there is a person or animal present and movement in any of the seating positions.

Another embodiment is when at least one thermal imaging system that sends signal directly to the system 10 and the system 10 would recognize various conditions such as an empty seat or a seat occupied by a child seat, a person, or an animal. Both the capacitive sensing and thermal imaging systems would also allow the system 10 to determine if there is movement in any of the seating positions.

Another embodiment is when at least one microphone system, such in a typical automotive configuration, sends signals directly to the system 10 and the system 10 would recognize various conditions such as a quiet cabin or a cabin with noise, where noise could be talking, crying, or other audible sound. Both the capacitive sensing and microphone systems would also allow the system 10 to determine if there is a person or animal making noise and in which of various seating positions.

Yet another embodiment would use a gas sensor to measure the concentration of carbon dioxide in the vehicle cabin. It is medically established that a living person will produce approximately 18% more carbon dioxide when thermally stressed. Measuring an increase in carbon dioxide concentration in the cabin, especially a rapid increase, would indicate not only that there is an occupant in the vehicle, but that the occupant may be going into thermal distress. Gas sensing may also include hydrogen and methane as well as gases with a sulfur component such as hydrogen sulfide and methanethiol.

In yet another embodiment, a moisture sensor may be used in conjunction with a capacitive seat sensor. The moisture sensor will provide information to the controller 34 as to whether the seat sensor has become contaminated with water, coffee, urine, or other substance so that a warning may be given on a driver information display, other instrument panel display, or remote device such as a key fob or a mobile phone. The warning is twofold in that it may provide an indication that there is an occupant in the vehicle and it may also indicate that the capacitive sensor has been compromised and cannot be relied on for an accurate reading of an occupant.

Some applications may not have capacitive sensors embedded into seat cushions or seat backs. In these cases, the aforementioned sensing methods may be used singly or in combination to provide occupant sensing methods without the need for capacitive sensors in vehicle seats.

A camera located in the front of the vehicle can provide a visual image that can be analyzed for detection of an occupant. These cameras could be located in the center stack display area, the headliner, or the A pillars of the vehicle. A camera could be located more midrange and placed in the dome light area or on the back side of a front seat headrest or in a seat back such as in a rear seat entertainment system. The camera system employed may be a standard type or a thermal imaging type.

Radar systems of any desirable frequency and transmission method could be employed in seat backs, head rests, headliners, center consoles, etc. can be used to detect even the smallest of motions to provide indication that an occupant is in the vehicle.

Vehicle microphones may be used to monitor for ambient noise when the vehicle is parked. This provides for detection of talking, crying, barking, etc. to provide an indication that there is an occupant in the vehicle. The microphones used may be the ones that are from the vehicle manufacturer for making phone calls, etc. or the microphones may be additional ones specifically for detecting sounds for occupancy detection.

Use of gas sensors to measure the concentration of relevant gases in the vehicle cabin, as previously mentioned, will provide indication of a vehicle occupant and essentially a vehicle occupant that is in physical distress.

Use of neuro-sensors provides real-time brain data without needing to contact the head of an occupant. Brain activity analysis is advancing quickly with correlation of brain signals and physiological status. Sensor locations can be in a headrest or a seat back cushion with a sensing distance of 3-30 cm.

All the mentioned sensors used individually or in combination will provide a reasonable indication of the presence of a vehicle occupant. If all, or a subset of the sensor data is provided to an electronic control, a determination can be made for vehicle occupancy. This determination can be made by using signal threshold limits, averaging, envelope analysis, pattern recognition, edge detection techniques, and the like. All of these are standard techniques used in algorithm development. An enhanced approach would include using artificial intelligence to further improve the detection capabilities and accuracy.

Artificial intelligence (AI) can play a crucial role in monitoring and analyzing sensor signals in vehicle occupant sensing systems. AI algorithms can process vast amounts of data from sensors to detect patterns and anomalies that signify the presence of an occupant as well as occupant health. By continuously monitoring sensor signals, electronic systems can provide real-time insights into the presence and health of vehicle occupants and identify potential issues before they escalate into life threatening situations.

AI has the capability to interpret electrical sensor signals and determine the presence of a human in a vehicle, leading to various applications in the automotive industry. One of the key sensors used for this purpose is the occupant detection sensor, which measures various parameters such as weight, pressure, and body heat. By employing AI algorithms, these sensor signals can be analyzed in real-time to accurately determine if a human is present in the vehicle.

The AI models trained on a diverse range of data can learn to recognize patterns and characteristics associated with human presence. For example, the AI models can identify a thermal signature unique to humans, allowing them to differentiate between a human and an inanimate object. This capability is crucial for ensuring the safety of occupants, as it can prevent accidents caused by leaving children or pets unattended in vehicles.

In addition to safety considerations, AI can also contribute to energy efficiency in vehicles. By accurately detecting human presence, AI algorithms can optimize energy consumption by activating or deactivating specific systems or components based on occupancy. For example, the AI system can adjust the power mode, dim the interior lights, or switch off non-essential features when no occupants are detected, thereby conserving energy.

Overall, AI's ability to interpret electrical sensor signals and determine human presence in vehicles has transformative implications for the automotive industry. From enhancing safety by preventing accidents and enabling personalized features to optimizing energy consumption in autonomous and conventional vehicles, AI's integration in occupant detection systems brings numerous benefits to both vehicle occupants and the broader transportation ecosystem.

While embodiments of the present disclosure have been illustrated and described, it is not intended that these embodiments illustrate and describe all possible forms of the present disclosure. Rather, the words used in the specification are words of description rather than limitation, and it is understood that various changes may be made without departing from the spirit and scope of the present disclosure.

The invention claimed is:

1. An occupant detection system for a vehicle comprising:
a user interface comprising a touch sensitive input device adapted to be fixedly mounted to a vehicle and having a touch sensitive active surface;
at least one first sensor located in a seat back of a seat assembly of the vehicle and at least one second sensor located in a seat cushion of the seat assembly, the at least one first sensor and the at least one second sensor being operable to detect an occupant in the seat assembly;
a controller in communication with the user interface and the at least one first sensor and the at least one second sensor to receive sensor signals from the at least one first sensor and the at least one second sensor and user interface signals from the user interface, the controller being operable to monitor the at least one first sensor and the at least one second sensor and the user interface;
wherein the controller includes an artificial intelligence algorithm to analyze in real-time and process the sensor signals and the user interface signals to detect patterns and anomalies and determines whether the seat assembly is one of unoccupied and occupied and characteristics of any occupant in the seat assembly if the seat assembly is occupied after determining a vehicle operator has or is leaving the vehicle; and
wherein the controller communicates the determination to at least one of a vehicle electronic controller and a remote device.

2. The occupant detection system as set forth in claim 1 wherein the touch sensitive active surface is part of a center stack.

3. The occupant detection system as set forth in claim 2 wherein the touch sensitive active surface includes an on/off switch acknowledgement of the seat assembly being occupied.

4. The occupant detection system as set forth in claim 2 wherein the touch sensitive active surface includes at least one of an indicator light and message indication of the seat assembly being occupied.

5. The occupant detection system as set forth in claim 1 wherein the controller monitors the seat assembly and the artificial intelligence algorithm analyzes the sensor signals in real-time to determine if a human is present by the characteristics of the occupant comprising presence, size, position, and type of the occupant of the seat assembly.

6. The occupant detection system as set forth in claim 1 including at least one camera located on the vehicle and to communicate with the controller, the at least one camera providing a field of vision of the seat assembly to the controller.

7. The occupant detection system as set forth in claim 6 wherein the at least one camera is used for thermal imaging of one of the occupant, a child seat, and a child seat forward and backward in the seat assembly.

8. The occupant detection system as set forth in claim 7 wherein the artificial intelligence algorithm recognizes patterns and characteristics associated with human presence by identifying a thermal signature of the thermal imaging unique to humans, allowing differentiation between a human and an inanimate object.

9. The occupant detection system as set forth in claim 6 wherein the at least one camera is located in a front of a cabin of the vehicle overlooking the seat assembly.

10. The occupant detection system as set forth in claim 6 wherein the at least one camera is part of a center stack, mirror, headliner, dome light, overhead storage area, and controls of the vehicle.

11. The occupant detection system as set forth in claim 6 wherein the at least one camera is located in an outside mirror of the vehicle to monitor a cabin of the vehicle when the outside mirror is folded in.

12. The occupant detection system as set forth in claim 6 wherein the at least one camera is located in a pillar of the vehicle to monitor one of a cabin of the vehicle and inside/outside viewing of the vehicle.

13. The occupant detection system as set forth in claim 6 wherein the at least one camera is located in at least one entertainment system in the seat back of the seat assembly.

14. The occupant detection system as set forth in claim 1 including a gas sensing sensor located on the vehicle for sensing gas comprising at least one of CO2, H2, and CH4 and to communicate a sensed gas signal to the controller.

15. The occupant detection system as set forth in claim 1 including a plurality of radar sensors located in the seat assembly to detect motion to provide an indication that the occupant is in the vehicle.

16. The occupant detection system as set forth in claim 1 including a plurality of neuro-sensors located in the seat assembly to provide real-time brain data of the occupant.

17. The occupant detection system as set forth in claim 1 wherein the artificial intelligence algorithm can optimize energy consumption of the vehicle by activating or deactivating specific systems or components based on occupancy of the seat assembly.

18. The occupant detection system as set forth in claim 17 wherein the artificial intelligence algorithm adjusts at least one of a power mode, the interior lights, and non-essential features when no occupant is detected in the seat assembly, thereby conserving energy.

19. The occupant detection system as set forth in claim 1 wherein the controller detects an audible noise in a cabin of the vehicle using microphones located on the vehicle.

20. The occupant detection system as set forth in claim 19 wherein the controller sends a signal to at least one of a cell phone, fob, and service if the audible noise is heard in the cabin of the vehicle.

21. An occupant detection system for a vehicle comprising:
a user interface comprising a touch sensitive input device adapted to be fixedly mounted to a vehicle and having a touch sensitive active surface;
a controller in communication with the user interface to receive user interface signals from the user interface, the controller being operable to monitor the user interface;
wherein the controller includes an artificial intelligence algorithm to analyze in real-time and process the user interface signals to detect patterns and anomalies and determines whether a seat assembly inside the vehicle is one of unoccupied and occupied and characteristics of any occupant in the seat assembly if the seat assembly is occupied after determining a vehicle operator has or is leaving the vehicle; and
wherein the controller communicates the determination to at least one of a vehicle electronic controller and a remote device.

* * * * *